(12) United States Patent
Jiang et al.

(10) Patent No.: US 10,776,688 B2
(45) Date of Patent: Sep. 15, 2020

(54) MULTI-FRAME VIDEO INTERPOLATION USING OPTICAL FLOW

(71) Applicant: NVIDIA Corporation, Santa Clara, CA (US)

(72) Inventors: Huaizu Jiang, Amherst, MA (US); Deqing Sun, Providence, RI (US); Varun Jampani, Nashua, NH (US)

(73) Assignee: NVIDIA Corporation, Santa Clara, CA (US)

( * ) Notice: Subject to any disclaimer, the term of this patent is extended or adjusted under 35 U.S.C. 154(b) by 128 days.

(21) Appl. No.: 16/169,851

(22) Filed: Oct. 24, 2018

(65) Prior Publication Data

US 2019/0138889 A1 May 9, 2019

Related U.S. Application Data

(60) Provisional application No. 62/582,135, filed on Nov. 6, 2017.

(51) Int. Cl.
*G06N 3/04* (2006.01)
*G06N 3/08* (2006.01)
(Continued)

(52) U.S. Cl.
CPC ........... *G06N 3/0454* (2013.01); *G06N 3/088* (2013.01); *G06T 7/251* (2017.01); *H04N 7/014* (2013.01);
(Continued)

(58) Field of Classification Search
CPC .... G06N 3/0454; G06N 3/0481; G06N 3/088; G06N 3/084; H04N 7/0137;
(Continued)

(56) References Cited

U.S. PATENT DOCUMENTS 6,192,079 B1   2/2001   Sharma et al.
6,438,275 B1   8/2002   Martins et al.
(Continued)

FOREIGN PATENT DOCUMENTS

EP   1978737 A2   10/2008
EP   2323372 A1   5/2011
(Continued)

OTHER PUBLICATIONS

Niklaus et al., "Context-aware Synthesis for Video Frame Interpolation," Mar. 29, 2018, 10 pages, retrieved from https://arxiv.org/pdf/1803.10967.pdf.
(Continued)

*Primary Examiner* — Chuong A Ngo
(74) *Attorney, Agent, or Firm* — Leydig, Voit & Mayer, Ltd.

(57) ABSTRACT

Video interpolation is used to predict one or more intermediate frames at timesteps defined between two consecutive frames. A first neural network model approximates optical flow data defining motion between the two consecutive frames. A second neural network model refines the optical flow data and predicts visibility maps for each timestep. The two consecutive frames are warped according to the refined optical flow data for each timestep to produce pairs of warped frames for each timestep. The second neural network model then fuses the pair of warped frames based on the visibility maps to produce the intermediate frame for each timestep. Artifacts caused by motion boundaries and occlusions are reduced in the predicted intermediate frames.

20 Claims, 14 Drawing Sheets

(51) Int. Cl.
*H04N 7/01* (2006.01)
*G06T 7/246* (2017.01)
(52) U.S. Cl.
CPC ......... *H04N 7/0127* (2013.01); *H04N 7/0137* (2013.01); *H04N 7/0147* (2013.01)
(58) Field of Classification Search
CPC .... H04N 7/0127; H04N 7/014; H04N 7/0147; G06T 7/251; G06T 2207/20084; G06T 2207/20081; G06T 7/20
See application file for complete search history.

(56) References Cited

U.S. PATENT DOCUMENTS

| | | |
|---|---|---|
| 7,103,231 B2 | 9/2006 | Cornog et al. |
| 7,548,664 B2 | 6/2009 | Souchard |
| 7,558,320 B2 | 7/2009 | Winder et al. |
| 8,487,929 B2 | 7/2013 | Lyashevsky |
| 8,768,103 B2 | 7/2014 | Ogino et al. |
| 9,626,770 B2 | 4/2017 | Taggart et al. |
| 2009/0052532 A1 | 2/2009 | Robinson |
| 2011/0134315 A1 | 6/2011 | Levy et al. |
| 2014/0307982 A1* | 10/2014 | Kanaev ............... G06T 3/4053 382/299 |
| 2015/0264385 A1 | 9/2015 | Ogawa |
| 2016/0301848 A1 | 10/2016 | Taggart et al. |
| 2017/0337682 A1* | 11/2017 | Liao .................... G06T 7/30 |

FOREIGN PATENT DOCUMENTS

| | | |
|---|---|---|
| EP | 1931145 B1 | 9/2018 |
| WO | 2002017645 A1 | 2/2002 |
| WO | 2003098402 A2 | 11/2003 |
| WO | 2016187776 A1 | 12/2016 |
| WO | 2018170393 A2 | 9/2018 |

OTHER PUBLICATIONS

Sadek et al., "Frame interpolation with occlusion detection using a time coherent segmentation," International Conference on Computer Vision Theory and Applications, Feb. 2012, 6 pages, retrieved from http://www.gpi.upf.edu/biblio/247.

Raket et al., "Motion Compensated Frame Interpolation with a Symmetric Optical Flow Constraint," International Symposium on Visual Computing, 2012, 11 pages, retrieved from https://www.researchgate.net/publication/265289203_Motion_Compensated_Frame_Interpolation_with_a_Symmetric_Optical_Flow_Constraint.

Gong et al., "Video Frame Interpolation and Extrapolation," Stanford University, 2017, pp. 1-7, retrieved from http://cs231n.stanford.edu/reports/2017/pdfs/714.pdf.

Baker et al., "A Database and Evaluation Methodology for Optical Flow," International Journal of Computer Vision, vol. 92, Mar. 2011, pp. 1-31.

Ilg et al., "FlowNet 2.0: Evolution of Optical Flow Estimation with Deep Networks," CVPR, 2017, 16 pages, retrieved from https://arxiv.org/pdf/1612.01925.pdf.

Liu et al., "Video Frame Synthesis using Deep Voxel Flow," ICCV, 2017, pp. 4463-4471.

Mahajan et al., "Moving Gradients: A Path-Based Method for Plausible Image Interpolation," ACM, 2009, 11 pages, retrieved from http://graphics.berkeley.edu/papers/Mahajan-MGP-2009-07/index.html.

Meyer et al., "Phase-Based Frame Interpolation for Video," CVPR, 2015, 9 pages, retrieved from http://www.ahornung.net/files/pub/2015-cvpr-phase-meyer.pdf.

Niklaus et al., "Video Frame Interpolation via Adaptive Convolution," CVPR, 2017, 10 pages, retrieved from http://web.cecs.pdx.edu/~fliu/papers/cvpr2017-interp.pdf.

Sun et al., " PWC-Net: CNNs for Optical Flow Using Pyramid, Warping, and Cost Volume," CVPR, 2018, 10 pages, retrieved from http://jankautz.com/publications/PWCNet_CVPR18.pdf.

* cited by examiner

MULTI-FRAME VIDEO INTERPOLATION USING OPTICAL FLOW

CLAIM OF PRIORITY

This application claims the benefit of U.S. Provisional Application No. 62/582,135 titled "END-TO-END MULTI-FRAME VIDEO INTERPOLATION USING OPTICAL FLOW," filed Nov. 6, 2017, the entire contents of which are incorporated herein by reference.

FIELD OF THE INVENTION

The present invention relates to video interpolation, and more particularly to video interpolation using optical flow.

BACKGROUND

Video interpolation is used to generate one or more additional frames between two consecutive frames. Increasing the number of frames enables video playback at a higher frame rate and slow motion playback. Video interpolation may also be used to generate smooth view transitions. The intermediate frames that are generated should be coherent, both spatially and temporally so that artifacts caused by occlusion are minimized. Conventional techniques generate a single frame between two consecutive frames and, when large motions occur between the two consecutive frames, artifacts are present in the single frame.

The conventional techniques cannot be directly used to generate arbitrary higher frame-rate videos. An approach of simply applying a single frame video interpolation method recursively to generate multiple intermediate frames has at least two limitations. First, recursive single-frame interpolation cannot be fully parallelized, and is therefore slow, since some frames cannot be computed until other frames are finished (e.g., in seven-frame interpolation, frame 2 depends on 0 and 4, while frame 4 depends on 0 and 8). Errors also accumulate during recursive interpolation. Second, single-frame interpolation can only generate $2^n-1$ intermediate frames (e.g., 3, 7). As a result, recursively applying single-frame video interpolation to generate 1008-fps (frame-per-second) video from 24-fps video requires generating 41 intermediate frames which is not efficient.

More recently, optical flow techniques have been used to perform frame interpolation. However, motion boundaries and severe occlusions are still challenging, and thus the interpolated frames tend to have artifacts around boundaries of moving objects. There is a need for addressing these issues and/or other issues associated with the prior art.

SUMMARY

Video interpolation is used to predict one or more intermediate frames at timesteps defined between two consecutive frames. A first neural network model approximates optical flow data defining motion between the two consecutive frames. A second neural network model refines the optical flow data and predicts visibility maps for each timestep. The two consecutive frames are warped according to the refined optical flow data for each timestep to produce pairs of warped frames for each timestep. The second neural network model then fuses the pair of warped frames based on the visibility maps to produce the intermediate frame for each timestep. Artifacts caused by motion boundaries and occlusions are reduced in the predicted intermediate frames.

A method, computer readable medium, and system are disclosed for video interpolation using optical flow. Forward optical flow data computed starting from a first frame to a second frame in a sequence of frames and intermediate forward optical flow data for a time in the sequence of frames that is between the first frame and the second frame is received. Backward optical flow data computed starting from the second frame to the first frame and intermediate backward optical flow data for the time is received. A flow interpolation neural network model generates an intermediate frame at the time based on the first frame and the second frame, the intermediate forward optical flow data, the intermediate backward optical flow data, the first frame warped according to the intermediate forward optical flow data, and the second frame warped according to the intermediate backward optical flow data.

DETAILED DESCRIPTION

There are many memorable moments in your life that you might want to record with a camera in slow-motion because the details are hard to see clearly with your eyes: the first time a baby walks, a difficult skateboard trick, a dog catching a ball, etc. While it is possible to capture 240-fps (frame-per-second) videos with a cell phone, professional high-speed cameras are still required for higher frame rates. In addition, many of the moments we would like to slow down are unpredictable, and as a result, are recorded at standard frame rates. Recording everything at high frame rates is impractical—requiring large storage capacity and is power intensive for mobile devices. Thus, it is of great interest to generate high-quality slow-motion video from existing videos. In addition to transforming standard videos to higher frame rates, video interpolation can be used to generate smooth view transitions. Video interpolation also has intriguing new applications in self-supervised learning, serving as a supervisory signal to learn optical flow from unlabeled videos.

A neural network model may be trained to interpolate one or more in-between (intermediate) frames for a video sequence. For instance, 240-fps videos may be generated from standard sequences (30-fps) by interpolating seven intermediate frames for every two consecutive frames. The intermediate frames that are generated by the neural network model are both spatially and temporally coherent within the video sequence. A successful solution should not only correctly interpret the motion between two input images (implicitly or explicitly), but also understand occlusions to reduce artifacts in the interpolated frames, especially around motion boundaries.

Figure 1A:
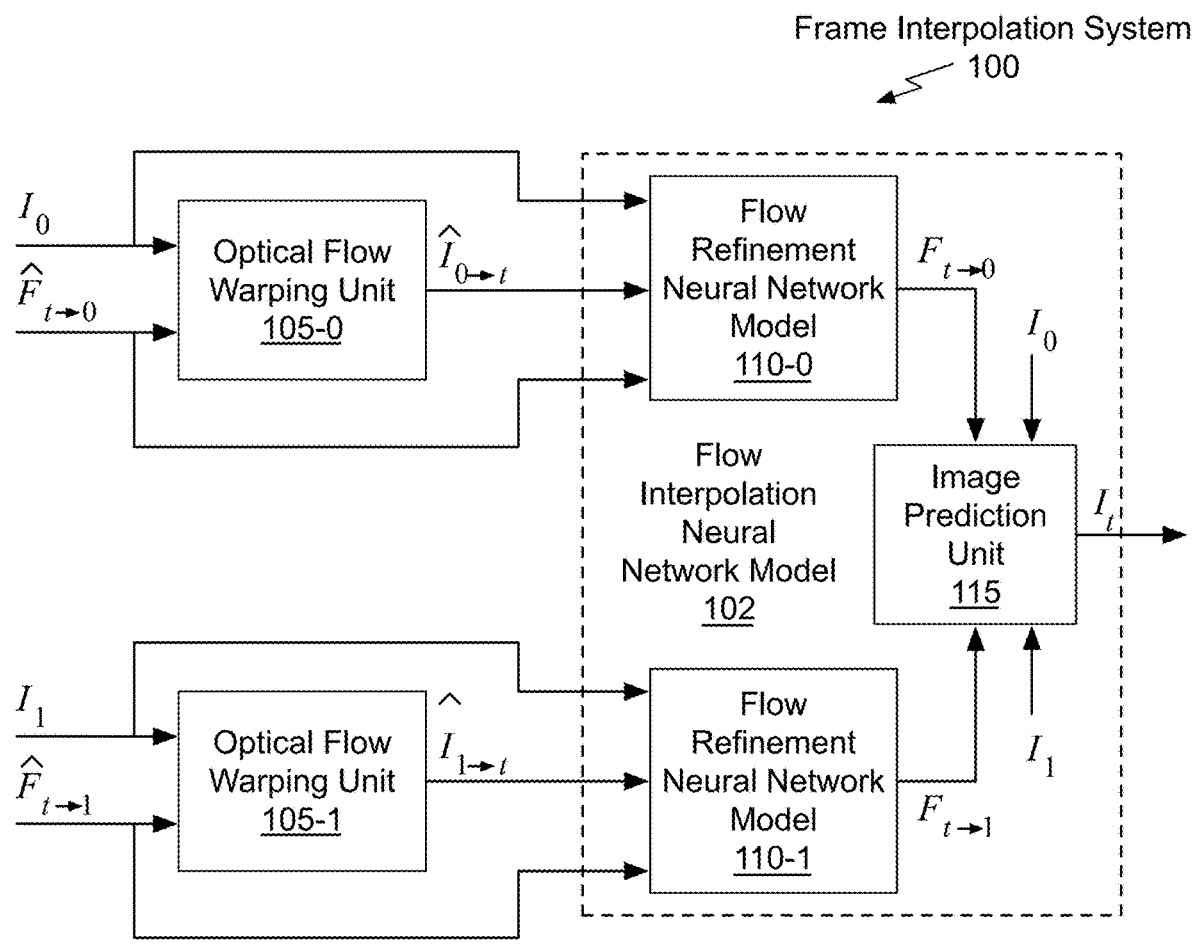
FIG. 1A illustrates a block diagram of a frame interpolation system, in accordance with an embodiment.

FIG. 1A illustrates a block diagram of a frame interpolation system 100, in accordance with an embodiment. A sequential image pair with color data ($I_0$ and $I_1$) is input to the frame interpolation system 100. In general, the frame interpolation system 100 receives input data at time t and at time t+1, such as two frames of a sequence of images. The input frame sequence may include dynamic scenes captured by a stationary or moving (e.g., panning) camera.

The frame interpolation system 100 includes an optical flow warping unit 105 and a flow refinement neural network model 110 and a flow interpolation neural network model for each one of the sequential input frames $I_0$ and $I_1$. The frame interpolation system 100 also includes an image prediction unit 115 configured to predict the intermediate frame $I_t$ at a time $t \in (0,1)$.

Although the frame interpolation system 100 is described in the context of processing units, one or more of the optical flow warping unit 105, the flow interpolation neural network model 102, and the image prediction unit 115 may be performed by a program, custom circuitry, or by a combination of custom circuitry and a program. For example, the flow interpolation neural network model 102 may be implemented by a GPU (graphics processing unit), CPU (central processing unit), or any processor capable of implementing layers of a neural network. Furthermore, persons of ordinary skill in the art will understand that any system that performs the operations of the frame interpolation system 100 is within the scope and spirit of embodiments of the present invention.

The frame interpolation system 100 is trained to directly output the RGB pixels of $I_t$. Importantly, the frame interpolation system 100 has to learn to interpret not only the motion patterns but also the appearance of the two input images. Due to the rich RGB color space, accurate prediction of high-quality intermediate images is difficult.

Bi-directional optical flows ($F_{1 \to 0}$, $F_{0 \to 1}$) are computed based on the input frames ($I_0$, $I_1$). The bi-directional optical flows are linearly combined to approximate intermediate bi-directional optical flows ($\hat{F}_{t \to 0}$, $\hat{F}_{t \to 1}$) for at least one timestep t between the two input frames. The input frames are each warped (backward) by the optical flow warping units 105-0 and 105-1 according to the approximated intermediate bi-directional optical flows for each timestep to produce warped input frames $\hat{I}_{0 \to t}$ and $\hat{I}_{1 \to t}$.

The flow refinement neural network model 102 includes flow refinement neural network models 110-0 and 110-1 and an image prediction unit 115. The intermediate bi-directional optical flows ($\hat{F}_{t \to 0}$, $\hat{F}_{t \to 1}$) are refined for each timestep by the flow refinement neural network models 110 using the two input frames the intermediate bi-directional optical flows, and the two warped input frames. The refined intermediate bi-directional optical flows ($F_{t \to 0}$, $F_{t \to 1}$) are output by the flow refinement neural network models 110-0 and 110-1. The refined intermediate bi-directional optical flows are processed by the image prediction unit 115 to produce the intermediate frame $I_t$.

In an embodiment, the image prediction unit 115 receives the two input frames and (backward) warps the two input frames according to the refined intermediate bi-directional optical flows for each timestep to produce refined warped input frames. Therefore, additional optical flow warping units 105 may be included in the image prediction unit 115 to generate the refined warped input frames, and the refined warped input frames are effectively linearly fused by the image prediction unit 115 to produce the intermediate frame for each timestep. In an embodiment, the image prediction unit receives the warped input frames ($\hat{I}_{0 \to t}$, $\hat{I}_{1 \to t}$) generated by the optical flow warping units 105-0 and 105-1, and the warped input frames are effectively linearly fused by the image prediction unit 115 to produce the intermediate frame for each timestep.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
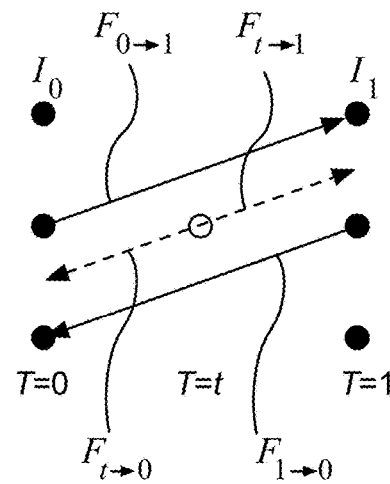
FIG. 1B is a conceptual diagram of flow interpolation, in accordance with an embodiment.

FIG. 1B is a conceptual diagram of intermediate optical flow interpolation, in accordance with an embodiment. At time T=0 a set of pixels (filled circles) display the first image $I_0$ shown in a first column and at time T=1, the set of pixels displays the second image $I_1$ shown in a third column. At time T=t a value of the center pixel (unfilled circle) is approximated, borrowing the optical flow data from pixels at the same position in the first and second frames (at T=0 and T=1) shown as the solid arrows. Borrowing the optical flow data from pixels in the first and second frames produces an accurate result when the optical flow field is locally smooth.

As shown in FIG. 1B, the bi-directional optical flow ($\hat{F}_{0 \to 1}$) is computed from the input frame $I_0$ to the input frame $I_1$ and the bi-directional optical flow ($F_{1 \to 0}$) is computed from the input frame $I_1$ to the input frame $I_0$. The bi-directional optical flows are linearly combined to approximate intermediate bi-directional optical flows ($\hat{F}_{t \to 0}$, $\hat{F}_{t \to 1}$) for the timestep t between the two input frames shown as the dashed arrows. Specifically, a forward intermediate optical flow $F_{t \to 1}(p)$ can be approximated as $$\hat{F}_{t \to 1}(p) = (1-t)F_{0 \to 1}(p) \qquad (1)$$

or $$\hat{F}_{t \to 1}(p) = -(1-t)F_{1 \to 0}(p) \qquad (2)$$

where the direction of the optical flow between the two input frames is taken in the same or opposite directions and the magnitude of the bi-directional optical flow is scaled accordingly ((1−t) in Equation (2)). Similar to the temporal consistency for RGB image synthesis, in an embodiment, the intermediate optical flow can be synthesized by combining the bi-directional optical flow as follows (in vector form).

$$\hat{F}_{t \rightarrow 0} = -(1-t)tF_{0 \rightarrow 1} + t^2 F_{1 \rightarrow 0} \qquad (3)$$

$$\hat{F}_{t \rightarrow 1} = -(1-t)^2 F_{0 \rightarrow 1} - t(1-t)F_{1 \rightarrow 0}$$

Approximating the intermediate optical flow by combining the bi-directional optical flow works well in smooth regions but poorly around motion boundaries, because the motion near motion boundaries is not locally smooth. To reduce artifacts around motion boundaries, which may cause poor image prediction, the flow refinement neural network model 110 learns to refine the intermediate bi-directional optical flows received by the flow interpolation neural network model 102. In an embodiment, the flow interpolation neural network model 102 is a convolutional neural network (CNN). The flow interpolation neural network model 102 refines the intermediate bi-directional optical flows ($\hat{F}_{t \rightarrow 0}$, $\hat{F}_{t \rightarrow 1}$) for each timestep using the intermediate bi-directional optical flows ($\hat{F}_{t \rightarrow 0}$, $\hat{F}_{t \rightarrow 1}$), the two input frames and the input frames warped by the optical flow warping units 105.

Figure 1C:
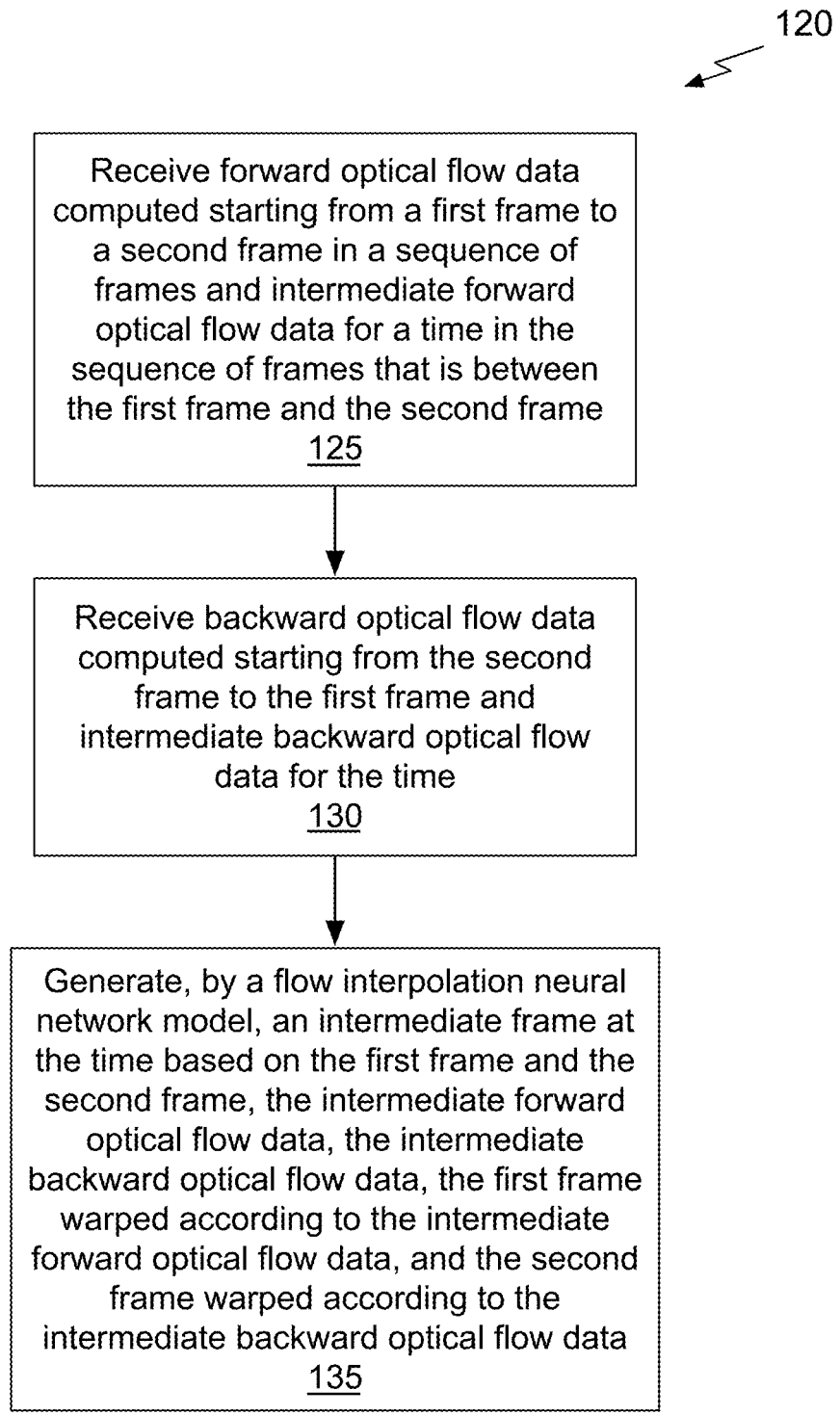
FIG. 1C illustrates a flowchart of a method for generating an intermediate frame using flow interpolation, in accordance with an embodiment.

FIG. 1C illustrates a flowchart of a method 120 for generating an intermediate frame using flow interpolation, in accordance with an embodiment. Although method 120 is described in the context of a processing unit, the method 120 may also be performed by a program, custom circuitry, or by a combination of custom circuitry and a program. For example, the method 120 may be executed by a GPU (graphics processing unit), CPU (central processing unit), or any processor capable of implementing a neural network model. Furthermore, persons of ordinary skill in the art will understand that any system that performs method 120 is within the scope and spirit of embodiments of the present invention.

At step 125, forward optical flow data ($F_{0 \rightarrow 1}$) and intermediate forward optical flow data ($\hat{F}_{t \rightarrow 0}$) are received by a flow refinement neural network model 110-0. In an embodiment, the forward optical flow data ($\hat{F}_{0 \rightarrow 1}$) are computed starting from a first frame $I_0$ to a second frame $I_1$ in a sequence of frames. In an embodiment, the backward optical flow data is computed starting from the second frame $I_1$ to the first frame $I_0$ and the intermediate forward optical flow data and the intermediate backward optical flow data are predicted using the forward and backward optical flow data. In an embodiment, the first frame $I_0$ and the second frame $I_1$ are processed by an intermediate optical flow neural network model to generate the forward optical flow data and the backward optical flow data.

The intermediate forward optical flow data are for a time T=t in the sequence of frames that is between the first frame and the second frame. In an embodiment, color data for each frame may be represented as red, green, and blue (RGB) color components, YUV components, or the like. Optical flow data comprises a flow field indicating a direction and magnitude of image data movement from the first frame to the second frame. In other words, a specific color of a particular pixel or edge of an object in the first frame may move to a different pixel in the second frame. The color may be associated with an object in a scene that moves between the first and second frames. Alternatively, a camera position used to capture the scene may change between the first and second frames (panning) so the object appears to move.

At step 130, intermediate backward optical flow data ($\hat{F}_{t \rightarrow 1}$) is received by the flow refinement neural network model 110-1. The intermediate backward optical flow data ($\hat{F}_{t \rightarrow 1}$) are for the time T=t in the sequence of frames that is between the first frame and the second frame.

At step 135, the flow interpolation neural network model 102 generates an intermediate frame at the time based on the first frame and the second frame, the intermediate forward optical flow data, the intermediate backward optical flow data, the first frame warped according to the intermediate forward optical flow data ($\hat{I}_{t \rightarrow 0}$), and the second frame warped according to the intermediate backward optical flow data ($\hat{I}_{1 \rightarrow t}$). In an embodiment, the optical flow warping unit 105-0 computes the first frame warped according to the intermediate forward optical flow data. In an embodiment, the optical flow warping unit 105-1 computes the second frame warped according to the intermediate backward optical flow data.

Figure 1D:
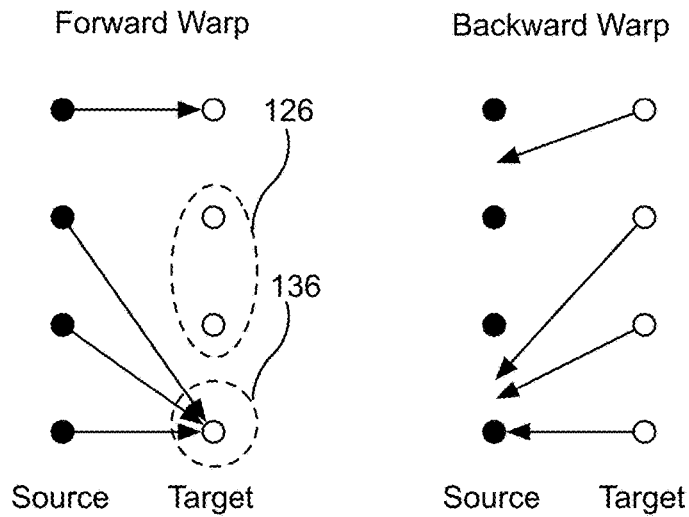
FIG. 1D is a conceptual diagram of forward and backward warping, in accordance with an embodiment.

FIG. 1D is a conceptual diagram of forward and backward warping, in accordance with an embodiment. The high-quality variable-length multi-frame interpolation technique performed by the frame interpolation system 100 predicts a frame at any arbitrary time step between two frames by warping the input two images to the specific time step and then adaptively fusing the two warped images to generate the intermediate image. In an embodiment, instead of performing a forward warping operation, a backward warping operation is applied to the first and second input frames. For the backward warp, each pixel in the intermediate (target) image finds a correspondence in the input (source) image. When forward warping is used, pixels 126 in the target image have no corresponding pixels in the source image and pixel 136 corresponds with several pixels in the source image. Therefore, backward warping may produce more accurate warped image data.

When the two intermediate bi-directional optical flows ($\hat{F}_{t \rightarrow 0}$, $\hat{F}_{t \rightarrow 1}$) are known, the intermediate image $I_t$ may be synthesized as follows:

$$\hat{I}_t = \alpha_0 \odot g(I_0, F_{t \rightarrow 0}) + (1 - \alpha_0) \odot g(I_1, F_{t \rightarrow 1}), \qquad (4)$$

where $g(\cdot,\cdot)$ is a backward warping function. The backward warping function can be implemented using bilinear interpolation and is differentiable, enabling training of the frame interpolation system 100. The parameter $\alpha_0$ controls the contribution of the two warped images and depends on two factors: temporal consistency and occlusion reasoning. $\odot$ denotes element-wise multiplication, implying content-aware weighting of input frames. For temporal consistency, the closer the time step T=t is to T=0, the more contribution $I_0$ makes to $\hat{I}_t$; a similar property holds for $I_1$.

Figure 1E:
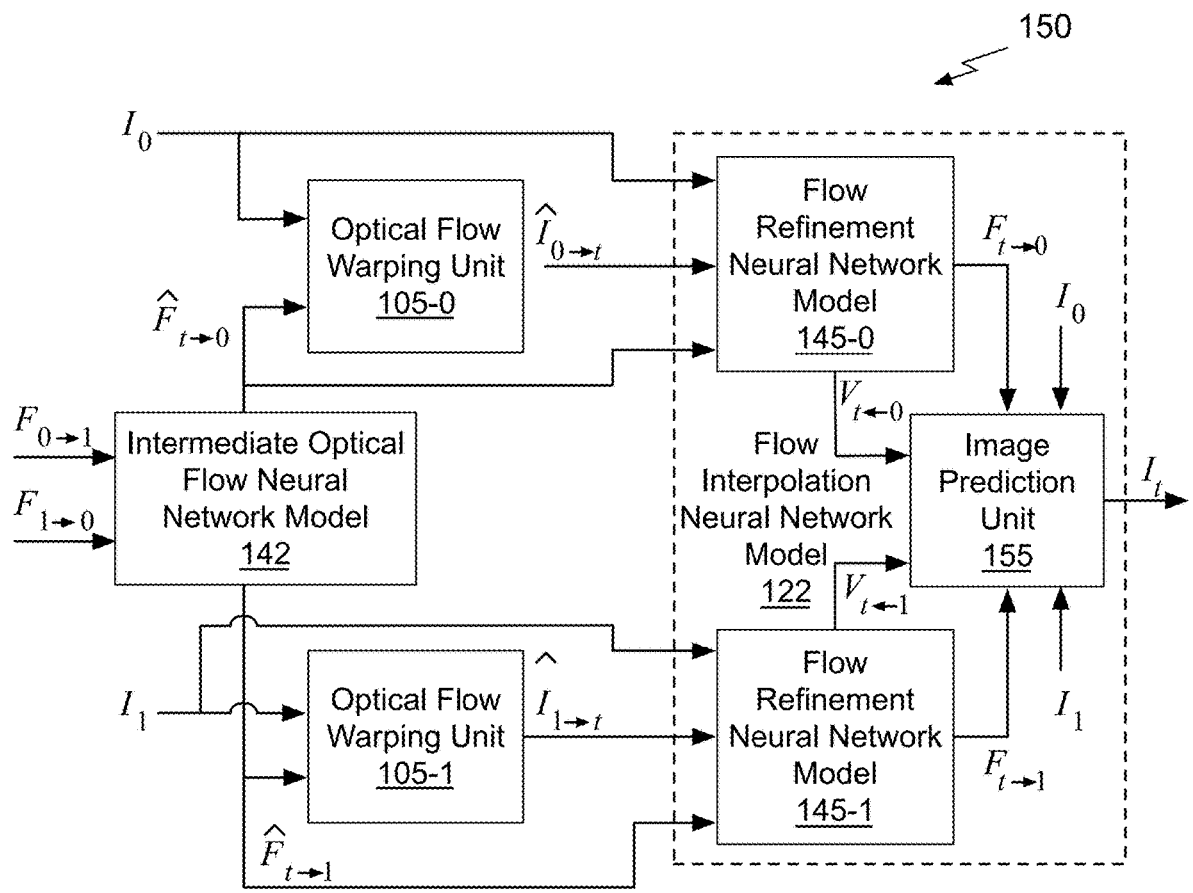
FIG. 1E illustrates a block diagram of another frame interpolation system, in accordance with an embodiment.

FIG. 1E illustrates a block diagram of another frame interpolation system 150, in accordance with an embodiment. The frame interpolation system 150 includes a flow interpolation neural network model 122, an intermediate optical flow neural network model 142 and optical flow warping units 105. The intermediate optical flow neural network model 142 receives the two input frames and approximates the bi-directional intermediate optical flows $\hat{F}_{t \rightarrow 0}$ and $\hat{F}_{t \rightarrow 1}$. In an embodiment, the intermediate optical flow neural network model 142 is a CNN. The flow interpolation neural network model 122 includes a flow refinement neural network model 145-0, a flow refinement neural network model 145-1, and an image prediction unit 155.

Although the frame interpolation system 150 is described in the context of processing units, one or more of the intermediate optical flow neural network model 142, the optical flow warping units 105, the flow refinement neural network models 145, and the image prediction unit 155 may be performed by a program, custom circuitry, or by a combination of custom circuitry and a program. For example, the flow refinement neural network models 145 may be implemented by a GPU (graphics processing unit), CPU (central processing unit), or any processor capable of implementing layers of a neural network. Furthermore, persons of ordinary skill in the art will understand that any system that performs the operations of the frame interpolation system 150 is within the scope and spirit of embodiments of the present invention.

An important property of the video frame interpolation problem is that if a pixel p is visible at T=t, it is most likely visible in at least one of the input frames, which means occlusion can be handled. To account for occlusion, the refinement neural network models 145-0 and 145-1 predict soft visibility maps $V_{t \leftarrow 0}$ and $V_{t \leftarrow 1}$, respectively, for each timestep. $V_{t \leftarrow 0}(p) \in [0,1]$ denotes whether the pixel p remains visible (0 is fully occluded and therefore, not visible) when moving from T=0 to T=t. The two visibility maps are forced to satisfy the following constraint $$V_{t \leftarrow 0} = 1 - V_{t \leftarrow 1}. \quad (5)$$

Without such a constraint, during training, the refinement neural network models 145 may diverge. Intuitively, $V_{t \leftarrow 0}(p)=0$ implies $V_{t \leftarrow 1}(p)=1$, meaning the pixel p from $I_0$ is occluded at T=t, so $I_1$ should be used to predict the intermediate frame. Conversely, when $V_{t \leftarrow 0}(p)=1$ implies $V_{t \leftarrow 1}(p)=0$, meaning the pixel p from $I_1$ is occluded at T=t, so $I_0$ should be used to predict the intermediate frame. Note that it rarely happens that a pixel at time t is occluded both at time T=0 and T=1. Since soft visibility maps are used, when the pixel p is visible both in $I_0$ and $I_1$, the flow interpolation neural network model 122 learns to adaptively combine the information from two images.

The soft visibility maps are applied to the warped input frames before the warped input frames are linearly fused by the image prediction unit 155 to produce the intermediate frame for each timestep. Combining the temporal consistency and occlusion reasoning, enables computation of the interpolated frame as:

$$\hat{I}_t = \frac{1}{Z} \odot ((1-t) V_{t \leftarrow 0} \odot g(I_0, F_{t \to 0}) + t V_{t \leftarrow 1} \odot g(I_1, F_{t \to 1})), \quad (6)$$

where $Z=(1-t)V_{t \to 0}+tV_{t \to 1}$ is a normalization factor.

In an embodiment, instead of directly predicting the intermediate optical flow in the refinement neural network models 145, slightly better performance is achieved by predicting intermediate optical flow residuals. In an embodiment, the refinement neural network models 145-0 and 145-1 predict $\Delta F_{t \to 0}$ and $\Delta F_{t \to 1}$, respectively. $F_{t \to 0}$ and $F_{t \to 1}$ are then computed as:

$$F_{t \to 0} = \hat{F}_{t \to 0} + \Delta F_{t \to 0} \quad (7)$$
$$F_{t \to 1} = \hat{F}_{t \to 1} + \Delta F_{t \to 1}$$

By applying the visibility maps to the warped images before fusion, the contribution of occluded pixels is excluded from the interpolated intermediate frame, thereby avoiding or reducing artifacts. Since none of parameters (e.g., weights) of the frame interpolation system 150 learned during training are time-dependent, the frame interpolation system 150 is able to produce as many intermediate frames as needed. In an embodiment, the frame interpolation system 150 can generate as many intermediate frames as needed in parallel.

In an embodiment, the intermediate optical flow neural network model 142 is implemented as an encoder and the flow interpolation neural network model 122 is implemented as a decoder. In an embodiment, the intermediate optical flow neural network model 142 is structured with 6 hierarchies, each consisting of two convolutional and one Leaky rectified linear unit (ReLU) layers. In an embodiment, at the end of each hierarchy except the last one, an average pooling layer with a stride of 2 is used to decrease the spatial dimension. In an embodiment, the flow interpolation neural network model 122 is structured with 5 hierarchies. In an embodiment, at the beginning of each hierarchy, a bilinear upsampling layer is used to increase the spatial dimension by a factor of 2, followed by two convolutional and Leaky ReLU layers.

In an embodiment, the frame interpolation system 150 is trained using 1,132 240-fps video clips, containing 300K individual video frames. Experimental results on several datasets, predicting different numbers of interpolated frames, demonstrate that the frame interpolation system 150 performs consistently better than conventional interpolated image generation techniques. In contrast with conventional frame interpolation techniques for performing single-frame interpolation, the frame interpolation system 150 may perform variable-length multi-frame video interpolation, where the motion interpretation and occlusion reasoning are jointly modeled. The motion interpretation and occlusion reasoning are modeled in the end-to-end trainable frame interpolation system 150 comprising the intermediate optical flow neural network model 142 and the flow refinement neural network models 145-0 and 145-1.

Figure 1F:
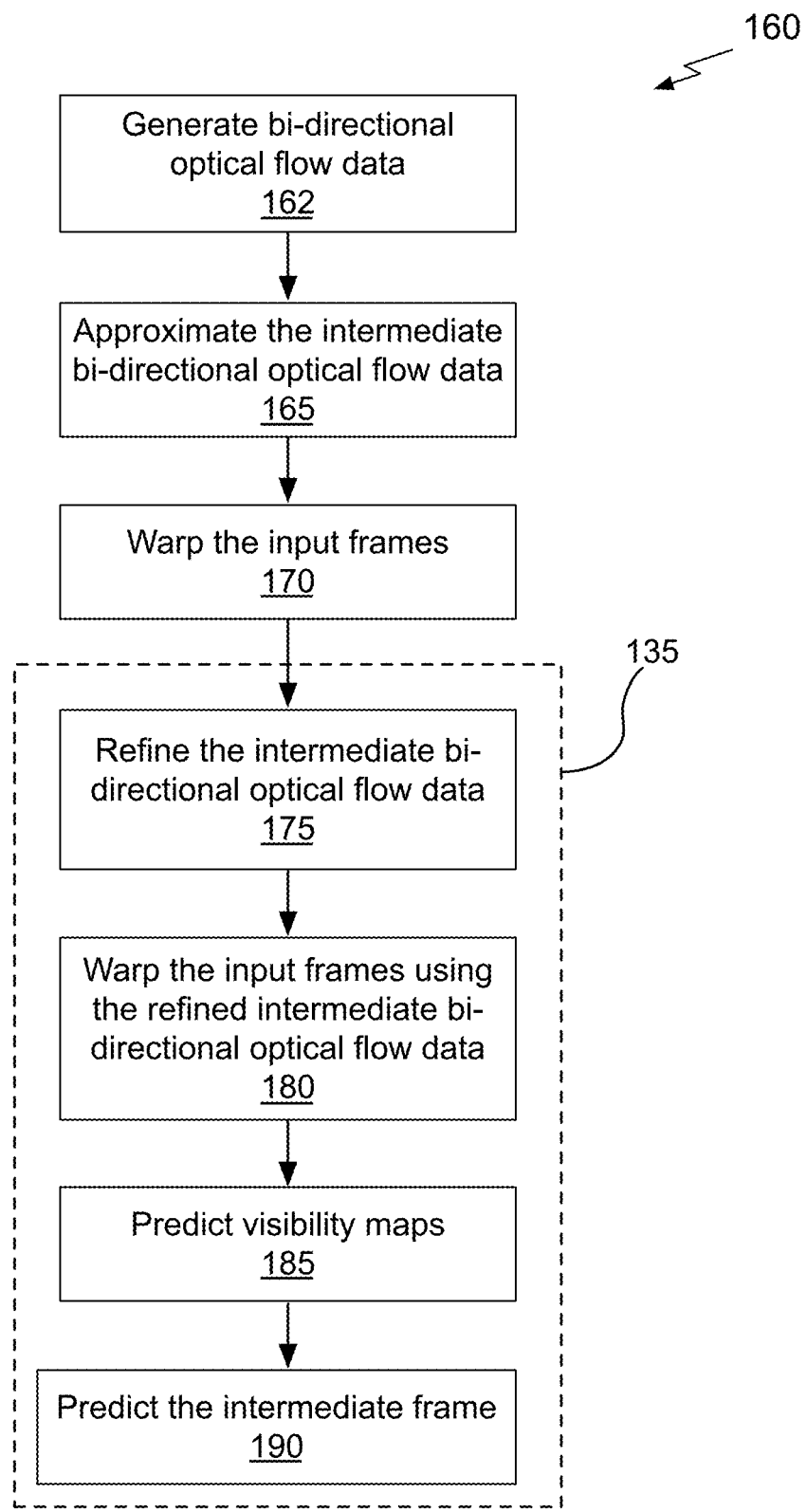
FIG. 1F illustrates a flowchart of another method for generating an intermediate frame using flow interpolation, in accordance with an embodiment.

FIG. 1F illustrates a flowchart of another method 160 for generating an intermediate frame using flow interpolation, in accordance with an embodiment. Although method 160 is described in the context of a processing unit, the method 160 may also be performed by a program, custom circuitry, or by a combination of custom circuitry and a program. For example, the method 160 may be executed by a GPU (graphics processing unit), CPU (central processing unit), or any processor capable of implementing a neural network model. Furthermore, persons of ordinary skill in the art will understand that any system that performs method 160 is within the scope and spirit of embodiments of the present invention.

At step 162 bi-directional (forward and backward) optical flow data ($\hat{F}_{0 \to 1}$, $\hat{F}_{1 \to 0}$) is generated. At step 165, intermediate bi-directional optical flow data $\hat{F}_{t \to 0}$ and $\hat{F}_{t \to 1}$ is approximated by the intermediate optical flow neural network model 142. In an embodiment, the flow refinement neural network model 145-0 computes $\Delta F_{t \to 0}$ and then computes the refined intermediate optical flow data $F_{t \to 0}$. In an embodiment, the image prediction unit 115 receives $\Delta F_{t \to 0}$ and then computes the refined intermediate optical flow data $F_{t \to 0}$. In an embodiment, the flow refinement neural network model 145-1 computes $\Delta F_{t \to 1}$ and then computes the refined intermediate optical flow data $F_{t \to 1}$. In an embodiment, the image prediction unit 115 receives $\Delta F_{t \to 1}$ and then computes the refined intermediate optical flow data $F_{t \to 1}$.

At step 170, the optical flow warping units 105 warp the input frames using the intermediate bi-directional optical flow data. At step 175, the flow refinement neural network models 145 refine the intermediate bi-directional optical flow data based on the warped input frames and the input frames. At step 185, the visibility maps are predicted by the flow interpolation neural network model 122 based on the inputs to the flow interpolation neural network model 122. In an embodiment, the flow refinement neural network model 145-0 predicts the visibility map $V_{t \to 0}$ based on the first input frame $I_0$, the intermediate forward optical flow data $\hat{F}_{t \to 0}$, and the first frame warped according to the intermediate forward optical flow data ($\hat{I}_{0 \to t}$). In an embodiment, the flow refinement neural network model 145-1 predicts the visibility map $V_{t \to 1}$ based on the second input frame $I_1$, the intermediate backward optical flow data $\hat{F}_{t \to 1}$, and the second frame warped according to the intermediate backward optical flow data ($\hat{I}_{1 \to t}$).

At step 190, the intermediate frame is predicted by the flow interpolation neural network model 122. In an embodiment, the image prediction unit 155 predicts the intermediate frame using equation (4) or (6). In an embodiment, at step 190, the image prediction unit 155 applies the visibility maps to the first warped frame and the warped second frame before computing the intermediate frame. In an embodiment, the image prediction unit 155 generates the first warped frame and the warped second frame using the refined intermediate optical flow data.

Figure 2A:
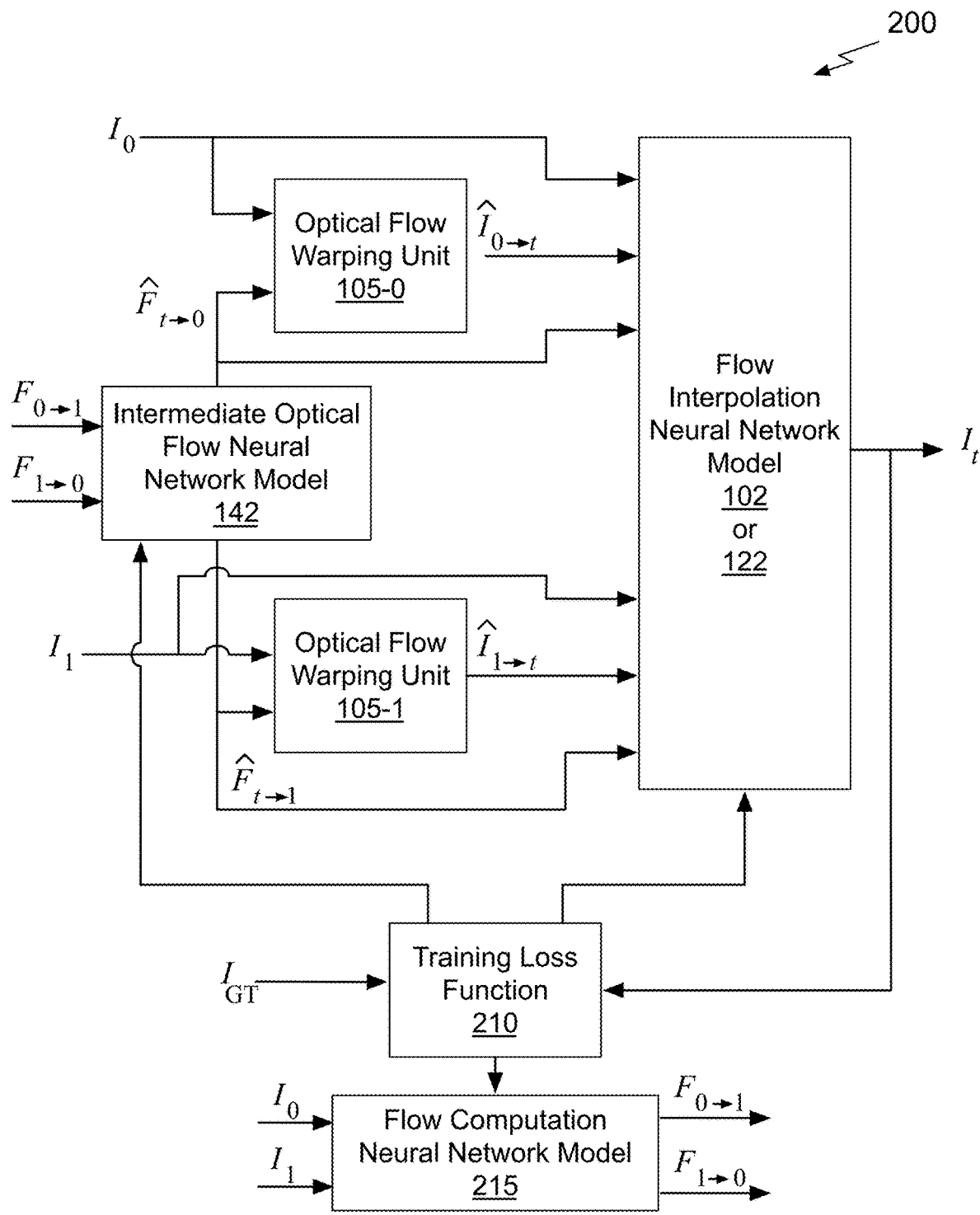
FIG. 2A illustrates a block diagram of another frame interpolation system, in accordance with an embodiment.

FIG. 2A illustrates a block diagram of another frame interpolation system 200, in accordance with an embodiment. In addition to the intermediate optical flow neural network model 122, the optical flow warping units 105, and the flow interpolation neural network model 102 or 122, the frame interpolation system 100 includes a training loss function 210 and a flow computation neural network model 215. In an embodiment, the flow computation neural network model 215 is implemented as a CNN. In an embodiment, the flow computation neural network model 215 is implemented as an encoder and decoder, and has large filters in the first few layers of the encoder to capture long-range motion. In an embodiment, 7×7 kernels are used in the first two convolutional layers and 5×5 kernels are used in the second hierarchy. In an embodiment, for layers in the rest of flow computation neural network model 215, 3×3 convolutional kernels are used.

The flow computation neural network model 215 receives the input frames and generates the bi-directional optical flow data (forward optical flow data and backward optical flow data) once to predict one or more interpolated frames between the input frames. In contrast, the other components in the frame interpolation system 200, namely, the intermediate optical flow neural network model 122, the optical flow warping units 105, and the flow interpolation neural network model 102 or 122, and the training loss function 210, compute data for each timestep corresponding to an interpolated frame.

During training, the training loss function 210 compares the intermediate frame with a ground truth frame and updates parameters of the flow computation neural network model 215, intermediate optical flow neural network model 142, and the flow interpolation neural network model 102 or 122 to reduce differences between the intermediate frame and the ground truth frame. Importantly, the flow computation neural network model 215, the intermediate optical flow neural network model 122, and the flow interpolation neural network model 102 or 122 are jointly trained to learn optical flow in an unsupervised manner. Training is performed using video sequences as training datasets where a subset of the frames are used as example intermediate frames. For instance, for a sequence of three frames in the video sequence, the first and third frames may be input to the frame interpolation system 100 and the second frame that occurs between the first and third frames is used as the example intermediate frame that is compared with the predicted intermediate frame generated by the frame interpolation system 100.

In an embodiment, the intermediate optical flow neural network model 122 and the flow refinement neural network models 145 are a fully convolutional neural network, consisting of an encoder and a decoder, with skip connections between the encoder and decoder features at the same spatial resolution. In an embodiment, the training loss function 210 evaluates one or more of a reconstruction loss, a perceptual loss, a warping loss, and a smoothing loss.

Given input frames (e.g., images) $I_0$ and $I_1$, a set of intermediate frames $$\{I_{t_i}\}_{i=1}^{N},$$

between $I_0$ and $I_1$, where $t_i \in (0,1)$, and the predicted intermediate frames $$\{\hat{I}_{t_i}\}_{i=1}^{N},$$

the loss function is a linear combination of four terms:

$$L = \lambda_r l_r + \lambda_p l_p + \lambda_w l_w + \lambda_s l_s. \quad (7)$$

A reconstruction loss $l_r$ models how good the reconstruction of the intermediate frames is:

$$l_r = \frac{1}{N} \sum_{i=1}^{N} \|\hat{I}_{t_i} - I_{t_i}\|_1 \quad (8)$$

Such a reconstruction loss is defined in the RGB space, where pixel values are in the range [0, 255].

Even when the $L_1$ loss is used to model the reconstruction error of intermediate frames, there may be blurring in the predictions. Therefore, a perceptual loss may be used to preserve details of the predictions and make interpolated frames sharper. Specifically, the perceptual loss $l_p$ is defined as $$l_p = \frac{1}{N} \sum_{i=1}^{N} \|\phi(\hat{I}_t) - \phi(I_t)\|_2 \quad (9)$$

Where φ denotes the conv4_3 features of a pretrained VGG-16 (Visual Geometry Group) model.

Besides intermediate predictions, a warping loss $l_w$ may be included to model the quality of the computed optical flow, defined as $$l_w = \|I_0 - g(I_1, F_{0 \to 1})\|_1 + \|I_1 - g(0, F_{1 \to 0})\|_1 + \qquad (10)$$
$$\frac{1}{N}\sum_{i=1}^{N}\|I_{t_i} - g(I_0, \hat{F}_{t_i \to 0})\|_1 + \frac{1}{N}\sum_{i=1}^{N}\|I_{t_i} - g(I_1, \hat{F}_{t_i \to 1})\|_1$$

Finally, a smoothness term may be included to encourage neighboring pixels to have similar flow values:

$$l_S = \|\nabla F_{0 \to 1}\|_1 + \|\nabla F_{1 \to 0}\|_1 \qquad (11)$$

The weights $\lambda_r$, $\lambda_p$, $\lambda_w$, and $\lambda_s$ may be set empirically using a validation set as $\lambda_r=0.8$, $\lambda_p=0.005$, $\lambda_w=0.4$, and $\lambda_s=1$. In an embodiment, components of the frame interpolation systems 100, 150, and 200 are differentiable, including the flow computation neural network model 210, optical flow warping units 105, intermediate optical flow neural network models 142, and flow refinement neural network models 102 and 122. Thus, the frame interpolation systems 100, 150, and 200 can be end-to-end trained.

Figure 2B:
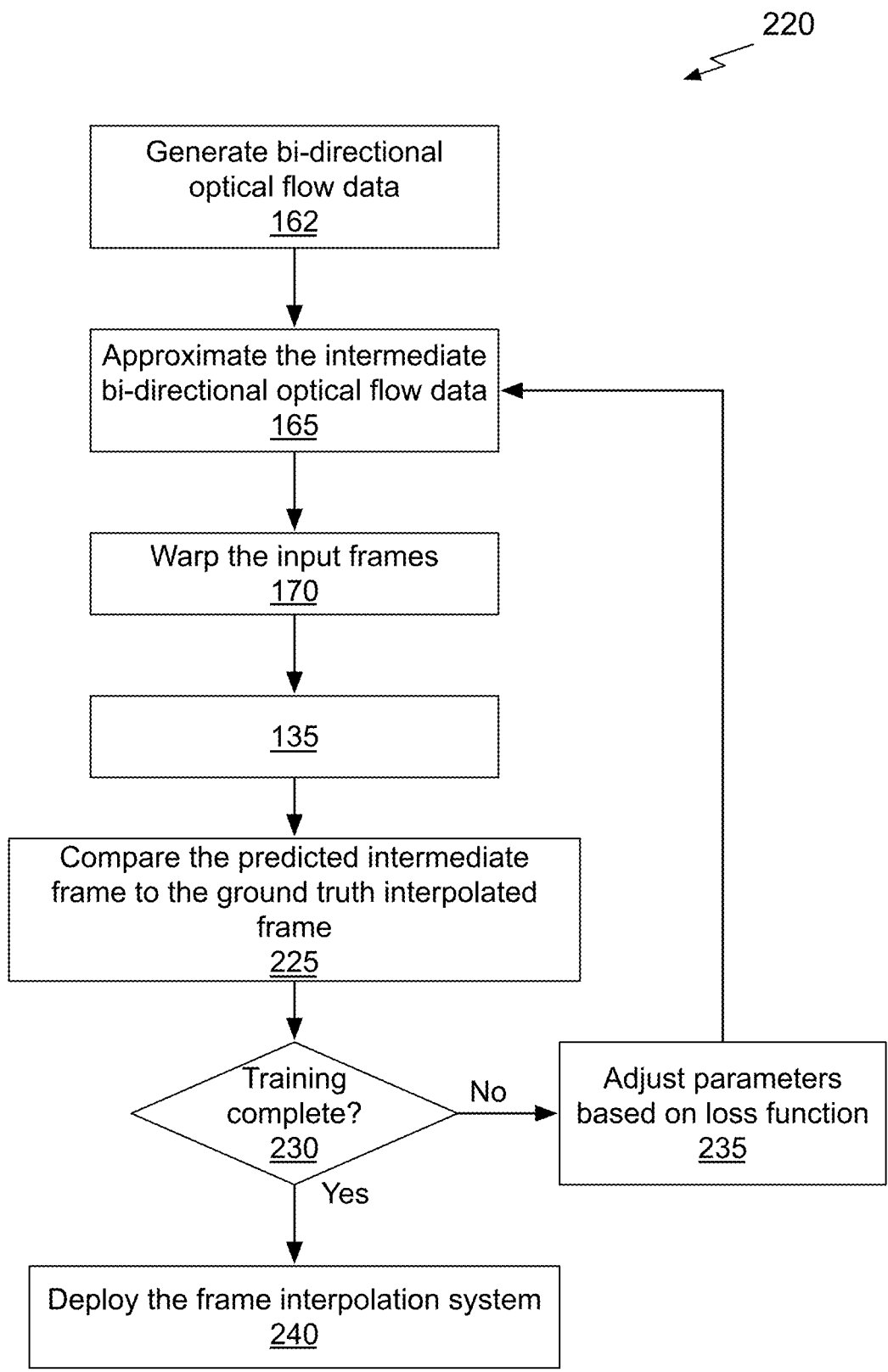
FIG. 2B illustrates a flowchart of a method for training the frame interpolation system, in accordance with an embodiment.

FIG. 2B illustrates a flowchart of a method 220 for training the frame interpolation systems 100, 150, and 200, in accordance with an embodiment. Although method 220 is described in the context of a processing unit, the method 220 may also be performed by a program, custom circuitry, or by a combination of custom circuitry and a program. For example, the method 220 may be executed by a GPU (graphics processing unit), CPU (central processing unit), or any processor capable of implementing a neural network model. Furthermore, persons of ordinary skill in the art will understand that any system that performs method 220 is within the scope and spirit of embodiments of the present invention.

Steps 162, 165, 170, and 135 are completed as previously described in conjunction with FIG. 1F. At step 225, the predicted intermediate frame is compared with the ground-truth frame. In an embodiment, the training loss function 210 compares the intermediate frame with a ground truth frame. At step 230, based on differences between the predicted frame and the ground truth frame, training may be complete. A loss function, such as the loss function defined by Equation (7), may be computed to measure distances (i.e., differences or gradients) between the ground truth frame and the predicted intermediate frame. In an embodiment, the loss function may be a combination of at least one of the reconstruction loss, the perceptual loss, the warping loss, and the smoothness loss. The intermediate optical flow neural network model 142 and the flow interpolation neural network model 102 or 122 are deemed to be sufficiently trained when the predicted frames generated for the input frames from the training dataset match the ground truth frames or a threshold accuracy is achieved for the training dataset.

When training is complete at step 230, at step 240, frame interpolation systems 100, 150, and 200 may be deployed to perform frame interpolation. Otherwise, when training is not complete at step 230, at step 235, parameters are adjusted based on the loss function and steps 165 through 230 are repeated. In an embodiment, at step 235, the parameters of the intermediate optical flow neural network model 142 and the flow interpolation neural network model 102 or 122 are adjusted to reduce differences between the intermediate frame and the ground truth frame. In an embodiment, the training loss function 210 adjusts the parameters of the intermediate optical flow neural network model 142 and the flow interpolation neural network model 102 or 122. Through the method 220, the intermediate optical flow neural network model 142 and the flow interpolation neural network model 102 or 122 may be trained to simultaneously learn frame interpolation.

Figure 2C:
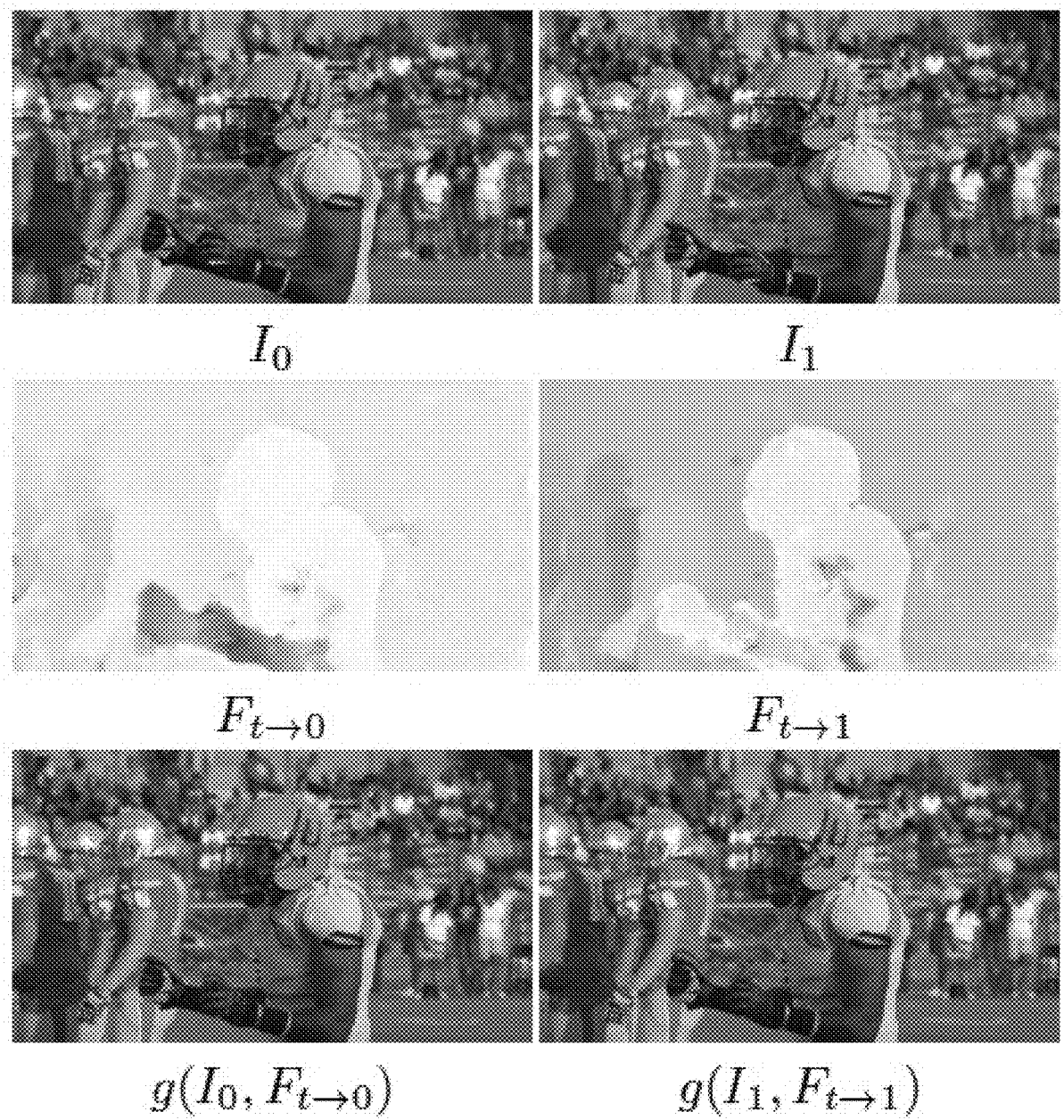
FIG. 2C illustrates input frames, bi-directional optical flows, and warped input frames, in accordance with an embodiment.

FIG. 2C illustrates input frames, bi-directional optical flows, and warped input frames, in accordance with an embodiment. In the input frames the arms of the football player move downwards from T=0 to T=1. The area directly above the arm at T=0 is visible at t, but the same area is occluded (i.e., invisible) at T=1. The bi-directional optical flows are approximated based on the input frames and are used to warp the input frames (shown in the last row).

Figure 2D:
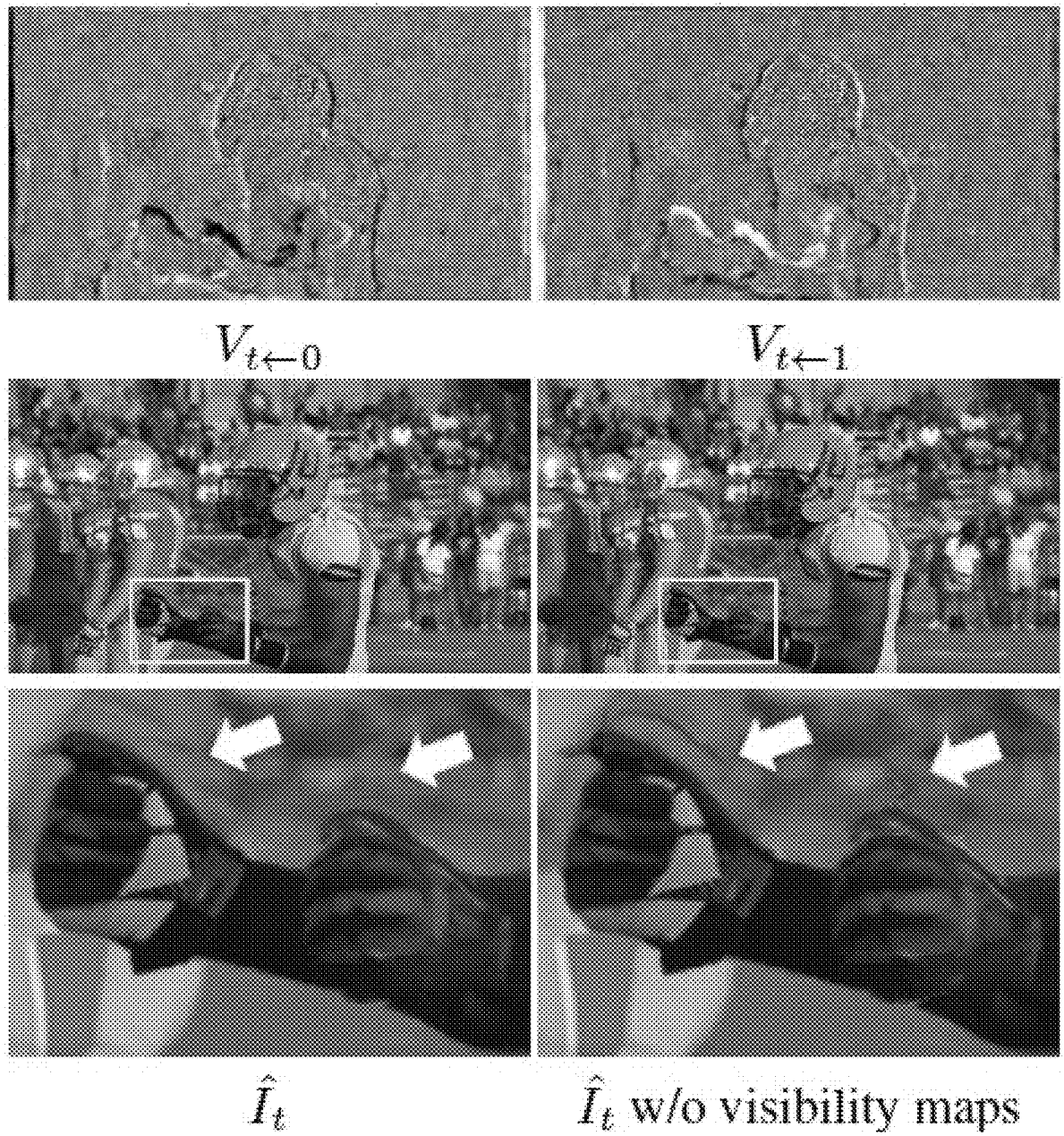
FIG. 2D illustrates visibility maps and predicted intermediate frames, in accordance with an embodiment.

FIG. 2D illustrates visibility maps and predicted intermediate frames, in accordance with an embodiment. Areas that are not visible are indicated by black in the visibility maps and areas that are visible are indicated by white. The visibility maps in the top row clearly show that the area directly above the arm at T=0 is visible and is occluded at T=1. The white area around the arms in $V_{t \leftarrow 1}$ indicates pixels in $I_1$ that contribute most to the predicted $I_t$ while the corresponding occluded pixels (in black areas) in $I_0$ have little contribution. Similar phenomena also occur around motion boundaries (e.g., around bodies of the athletes).

As previously explained, motion boundaries and severe occlusions are still challenging to conventional frame interpolation techniques. Therefore, the interpolated frames generated using the conventional frame interpolation techniques tend to have artifacts around boundaries of moving objects. In contrast, artifacts caused by motion boundaries and occlusions are reduced in intermediate frames predicted by the frame interpolation systems 100, 150, and 200. Conventional frame interpolation techniques rely on heuristics based intermediate flow computation (i.e., flow interpolation) and occlusion reasoning and are not end-to-end trainable. In contrast, the frame interpolation systems 100, 150, and 200 are end-to-end trainable. Furthermore, intermediate frames may be predicted by frame interpolation systems 100, 150, and 200 for a plain video without requiring reference images or supervised training. Finally, the frame interpolation systems 100, 150, and 200 may be extended to predict multiple intermediate frames in parallel. In contrast, conventional frame interpolation techniques rely on recursion to compute more than one intermediate frame, and, therefore, can only predict one intermediate frame at a time.

Parallel Processing Architecture

Figure 3:
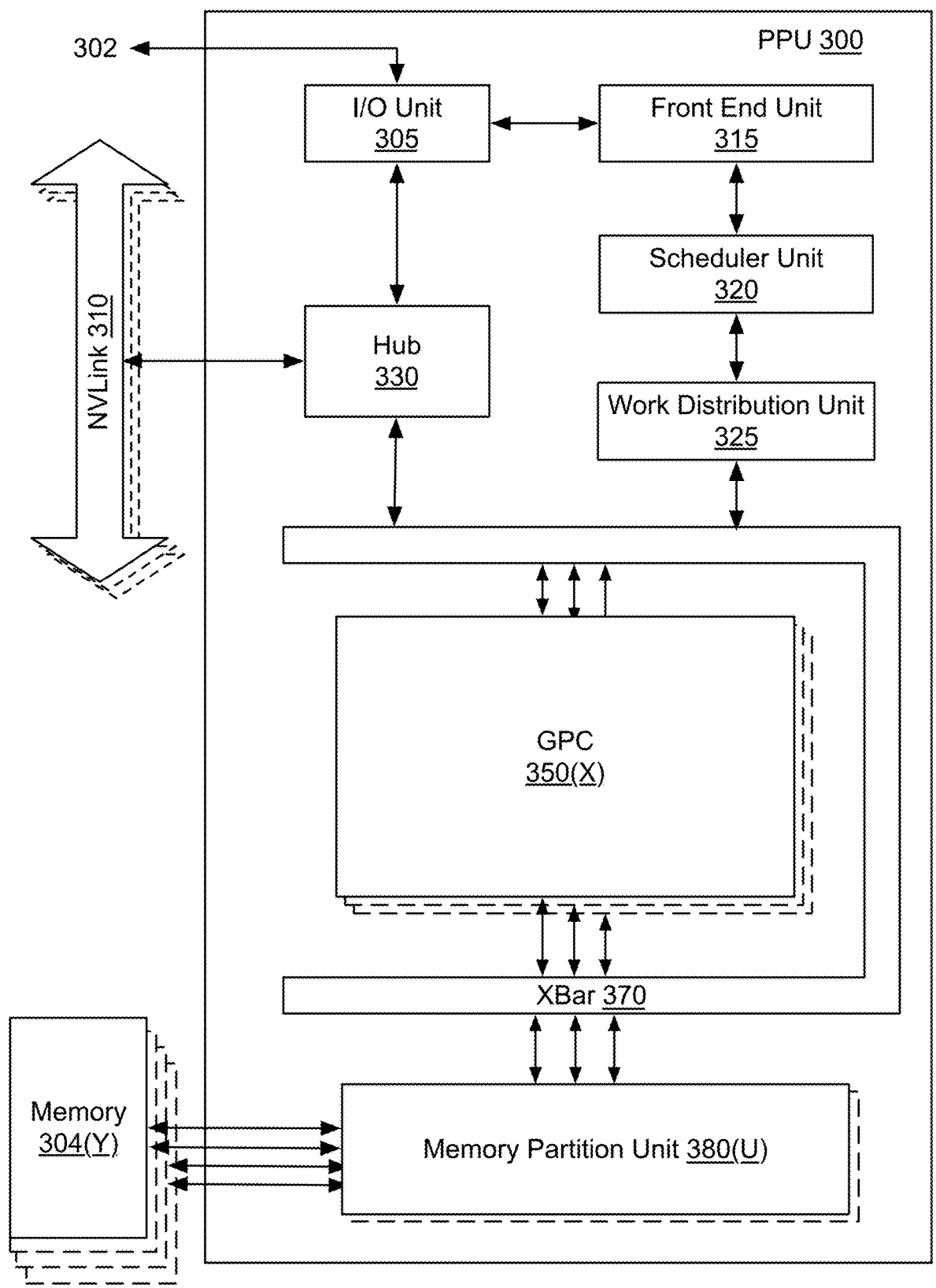
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
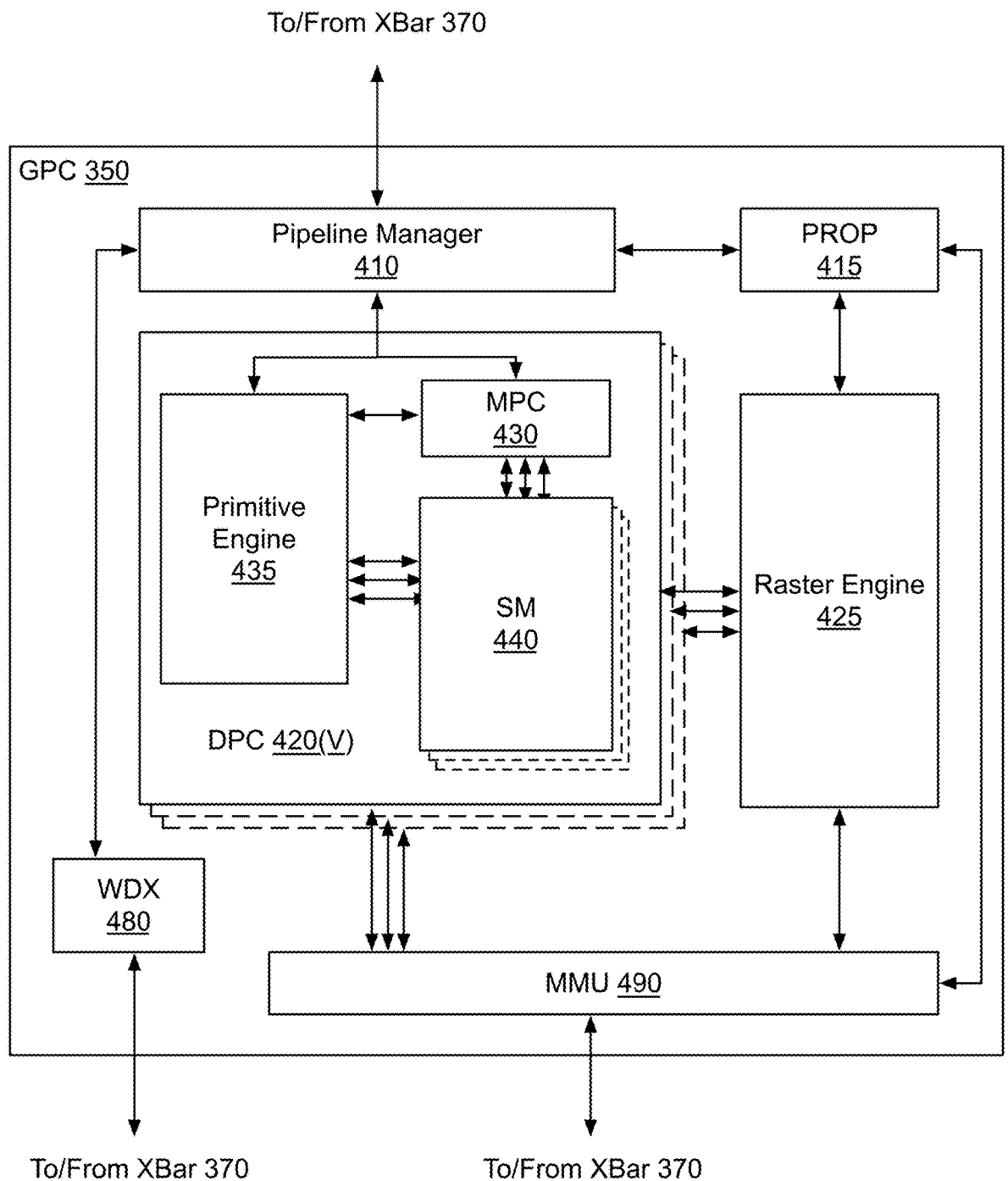
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
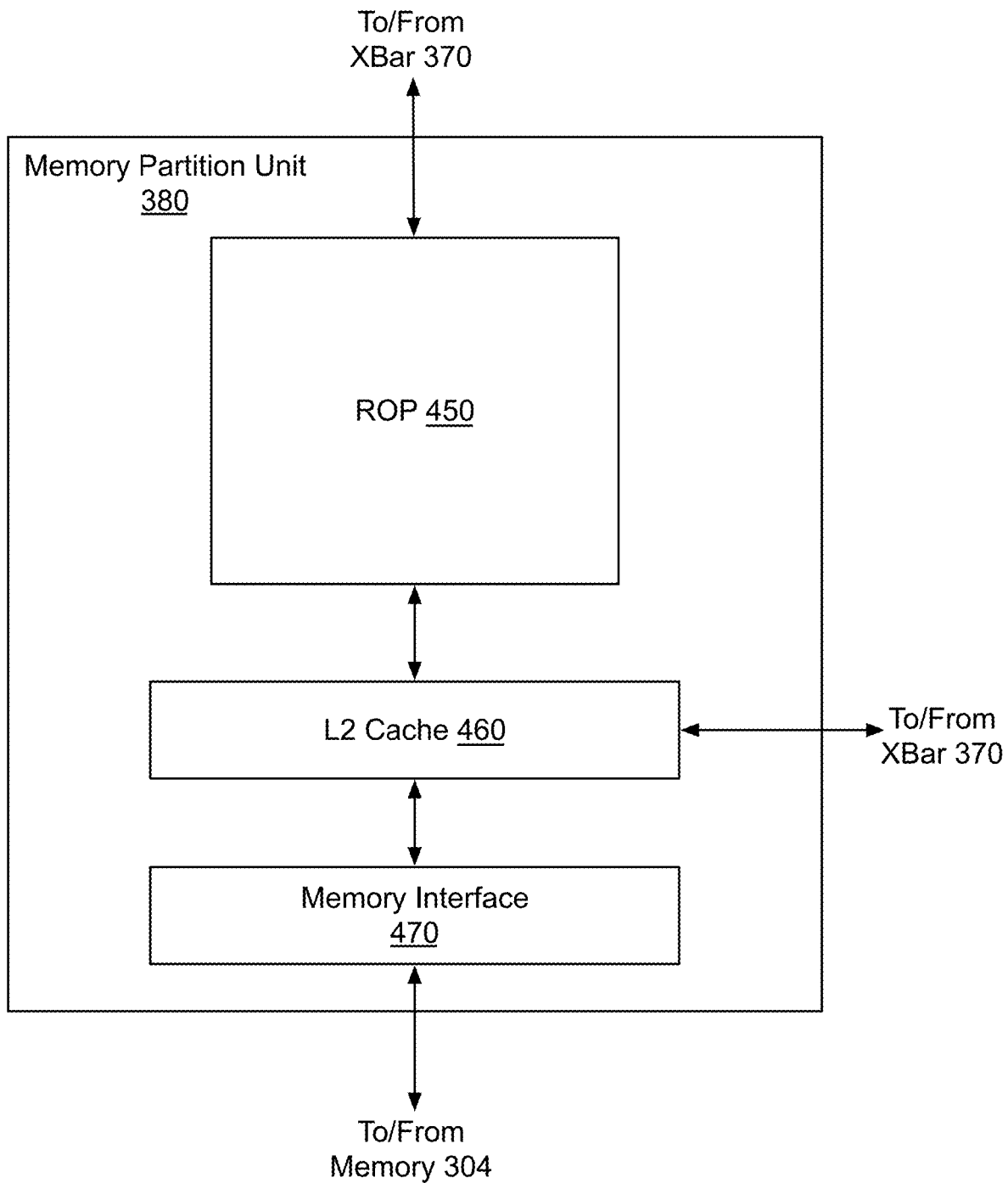
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
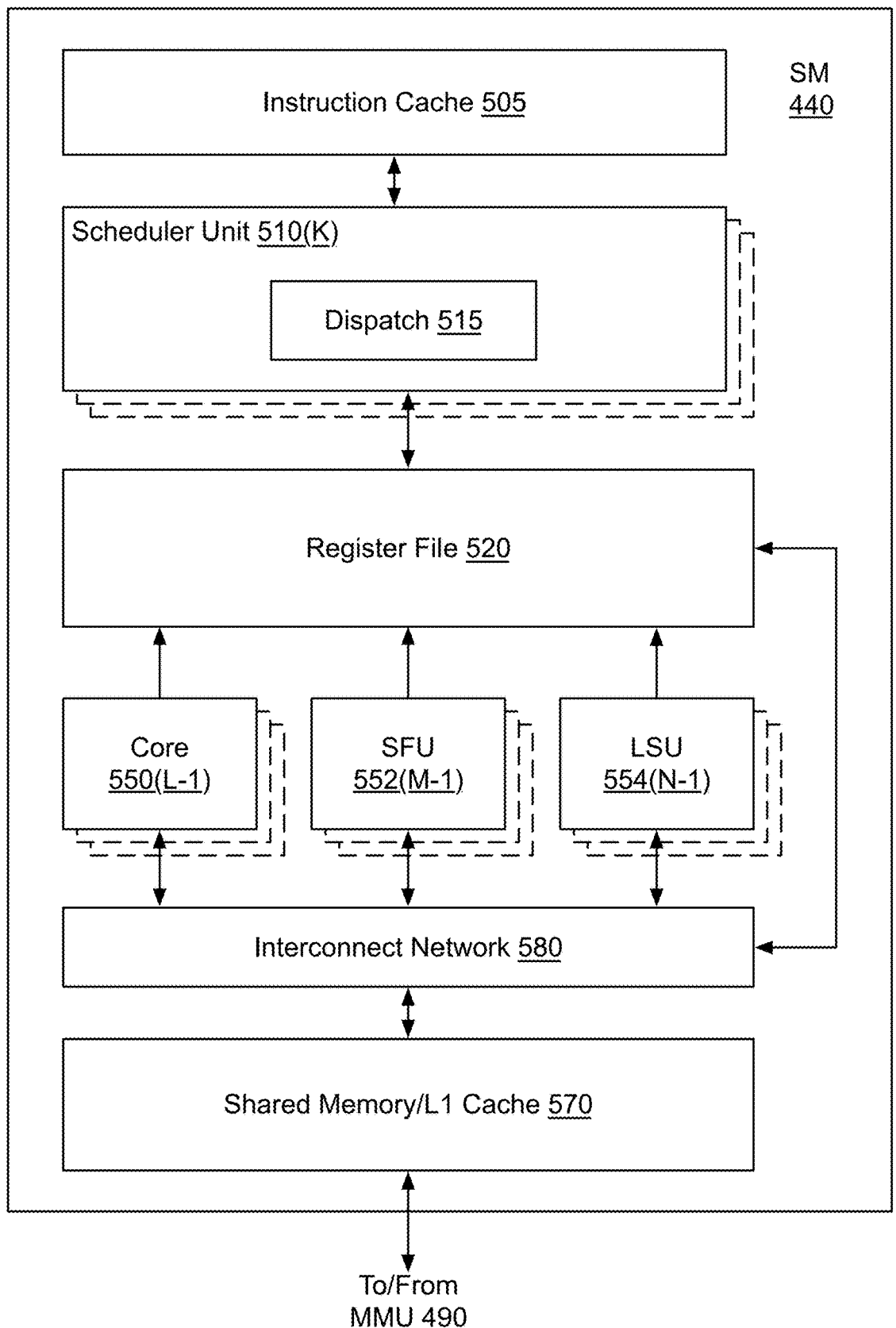
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
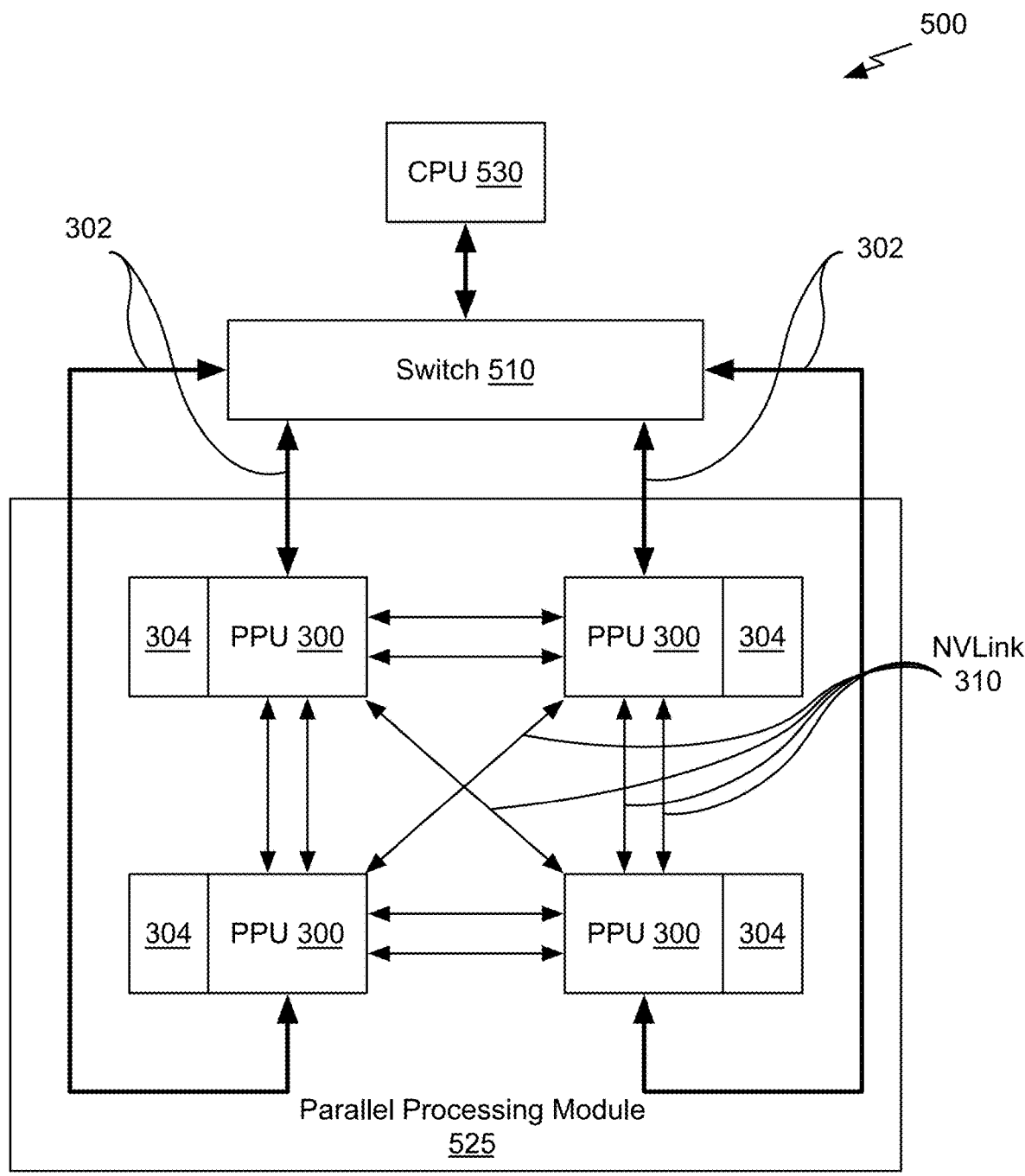
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the methods 100, 160, and 220 shown in FIGS. 1C, 1F, and 2B, respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
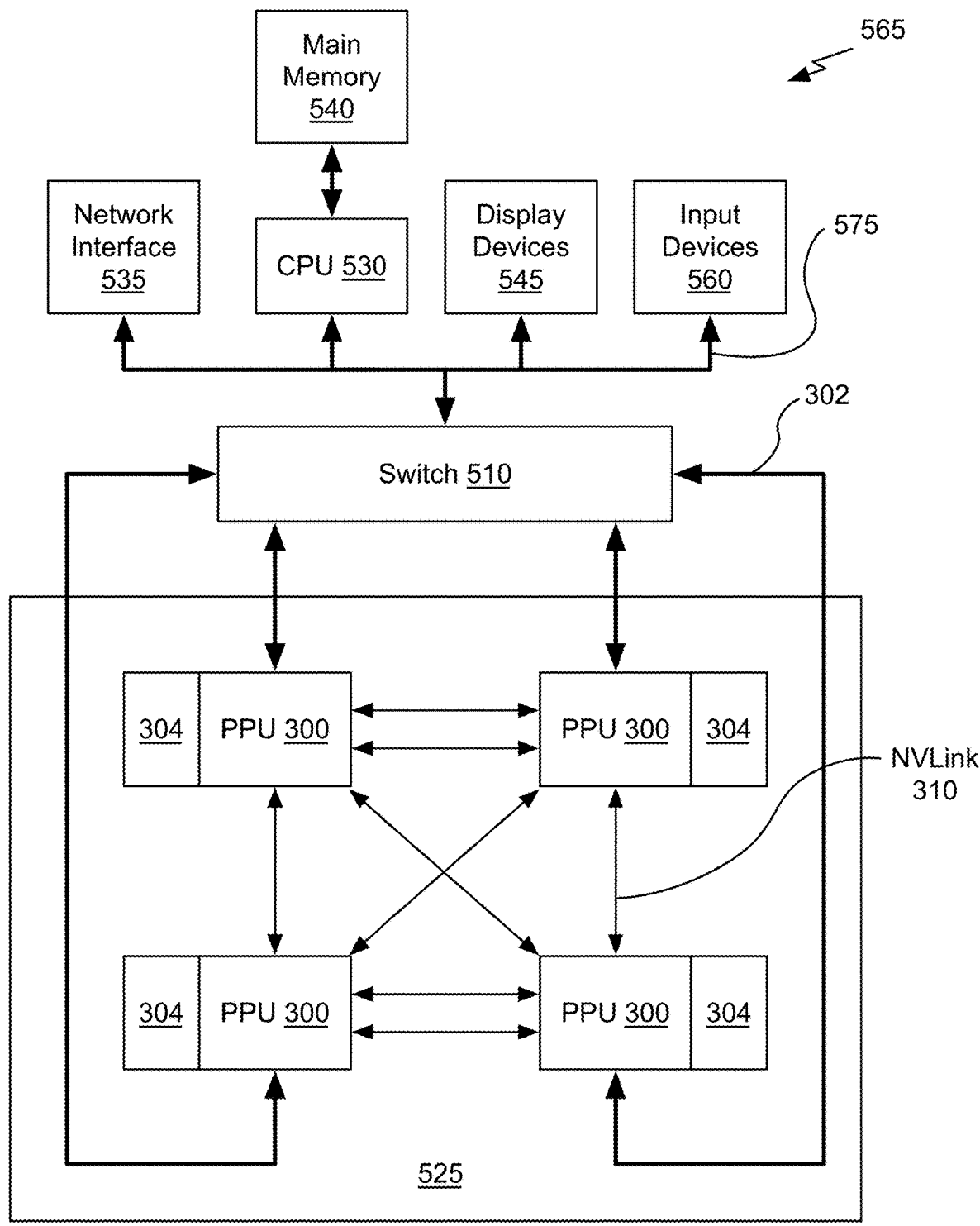
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 100, 160, and 220 shown in FIGS. 1C, 1F, and 2B, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
receiving forward optical flow data and backward optical flow data computed for consecutive frames including a first frame and a second frame in a sequence of frames, wherein the sequence of frames does not include a frame at a time between the first frame and the second frame;
warping the first frame according to approximated forward optical flow data corresponding to the time;
warping the second frame according to approximated backward optical flow data corresponding to the time;
predicting, by a flow interpolation neural network model, occlusion data for the consecutive frames; and
generating, by the flow interpolation neural network model, an intermediate frame at the time based on the warped first frame, the warped second frame, and the occlusion data, wherein occluded pixels in the warped first and second frames, as indicated by the occlusion data, are excluded from contributing to the intermediate frame.

2. The computer-implemented method of claim 1, further comprising interpolating, by the flow interpolation neural network model, between the forward optical flow data and the backward optical flow data to generate the approximated forward optical flow data and the approximated backward optical flow data.

3. The computer-implemented method of claim 2, wherein the flow computation neural network model and the flow interpolation neural network model are convolutional neural network models.

4. The computer-implemented method of claim 1, further comprising generating, by a flow computation neural network model, the forward optical flow data and the backward optical flow data based on the consecutive frames.

5. The computer-implemented method of claim 4, wherein the flow computation neural network model and the flow interpolation neural network model are jointly trained in an unsupervised manner.

6. The computer-implemented method of claim 4, wherein the flow computation neural network model and the flow interpolation neural network model are jointly trained using a loss function that minimizes perceptual loss.

7. The computer-implemented method of claim 4, wherein the flow computation neural network model and the flow interpolation neural network model are jointly trained using a loss function that minimizes reconstruction loss.

8. The computer-implemented method of claim 4, wherein the flow computation neural network model and the flow interpolation neural network model are jointly trained using a loss function that minimizes warping loss.

9. The computer-implemented method of claim 4, wherein the flow computation neural network model and the flow interpolation neural network model are jointly trained using a loss function that minimizes smoothness loss.

10. The computer-implemented method of claim 1, wherein the occlusion data comprises a forward visibility map and a backward visibility map that are predicted by the flow interpolation neural network model.

11. The computer-implemented method of claim 1, further comprising:
receiving second approximated forward optical flow data corresponding to a second time in the sequence of frames that is between the consecutive frames;
receiving second approximated backward optical flow data corresponding to the second time; and
generating, by the flow interpolation neural network model, a second intermediate frame at the second time based on the first frame warped according to the second approximated forward optical flow data, the second frame warped according to the second approximated backward optical flow data, and the occlusion data, wherein occluded pixels in the first frame warped according to the second approximated forward optical flow data and the second frame warped according to the second approximated backward optical flow data, as indicated by the occlusion data indicates, are excluded from contributing to the second intermediate frame.

12. The computer-implemented method of claim 1, wherein the flow interpolation neural network model generates the intermediate frame corresponding to the time by linearly fusing the warped first frame and the warped second frame.

13. The computer-implemented method of claim 12, further comprising, before the linear fusing, applying a forward visibility map to the warped first frame and applying a backward visibility map to the warped second frame.

14. A system, comprising:
a frame interpolation system configured to:
receive forward optical flow data and backward optical flow data computed for consecutive frames including a first frame and a second frame in a sequence of frames, wherein the sequence of frames does not include a frame at a time between the first frame and the second frame;
warp the first frame according to approximated forward optical flow data corresponding to the time;
warping the second frame according to approximated backward optical flow data corresponding to the time;
predict occlusion data for the consecutive frames; and
predict, by a flow interpolation neural network model, occlusion data for the consecutive frames; and
generate, by the flow interpolation neural network model, an intermediate frame at the time based on the warped first frame, the warped second frame, and the occlusion data, wherein occluded pixels in the warped first and second frames, as indicated by the occlusion data, are excluded from contributing to the intermediate frame.

15. The system of claim 14, wherein the frame interpolation system further comprises an intermediate optical flow neural network model configured to interpolate between the forward optical flow data and the backward optical flow data to generate the approximated forward optical flow data and the approximated backward optical flow data corresponding to the time.

16. The system of claim 14, wherein the frame interpolation system further comprises a flow computation neural network model configured to generate the forward optical flow data and the backward optical flow data based on the consecutive frames.

17. The system of claim 16, wherein the flow computation neural network model and the flow interpolation neural network model are jointly trained in an unsupervised manner.

18. The system of claim 14, wherein the occlusion data comprises a forward visibility map and a backward visibility map that are predicted by the flow interpolation neural network model.

19. The system of claim 14, wherein the flow interpolation neural network model generates the intermediate frame corresponding to the time by linearly fusing the warped first frame and the warped second frame.

20. A non-transitory, computer-readable storage medium storing instructions that, when executed by a processing unit, cause the processing unit to:
receive forward optical flow data and backward optical flow data computed for consecutive frames including a first frame and a second frame in a sequence of frames, wherein the sequence of frames does not include a frame at a time between the first frame and the second frame;
warp the first frame according to approximated forward optical flow data corresponding to the time;
warp the second frame according to approximated backward optical flow data corresponding to the time;
predict, by a flow interpolation neural network model, occlusion data for the consecutive frames; and
generate, by the flow interpolation neural network model, an intermediate frame at the time based on the warped first frame, and the warped second frame, and the occlusion data, wherein occluded pixels in the warped first and second frames, as indicated by the occlusion data, are excluded from contributing to the intermediate frame.

\* \* \* \* \*